United States Patent
Starr

(10) Patent No.: US 10,327,591 B2
(45) Date of Patent: *Jun. 25, 2019

(54) TOASTER OVEN CONTROL KNOB AND METHOD OF CONTROLLING A TOASTER OVEN

(71) Applicant: Hamilton Beach Brands, Inc., Glen Allen, VA (US)

(72) Inventor: William D Starr, Richmond, VA (US)

(73) Assignee: Hamilton Beach Brands, Inc., Glen Allen, VA (US)

(*) Notice: Subject to any disclaimer, the term of this patent is extended or adjusted under 35 U.S.C. 154(b) by 251 days.

This patent is subject to a terminal disclaimer.

(21) Appl. No.: 15/181,662

(22) Filed: Jun. 14, 2016

(65) Prior Publication Data

US 2017/0060170 A1    Mar. 2, 2017

Related U.S. Application Data

(63) Continuation-in-part of application No. 15/003,337, filed on Jan. 21, 2016.

(60) Provisional application No. 62/209,435, filed on Aug. 25, 2015.

(51) Int. Cl.
*A47J 37/08* (2006.01)
*A47J 37/06* (2006.01)
*G05G 1/08* (2006.01)
*G05G 5/00* (2006.01)

(52) U.S. Cl.
CPC ....... *A47J 37/0842* (2013.01); *A47J 37/0629* (2013.01); *G05G 1/08* (2013.01); *G05G 5/005* (2013.01)

(58) Field of Classification Search
CPC ............... A47J 37/0629; A47J 37/0664; A47J 37/0842; A47J 37/00; G05G 9/02; G05G 1/087; G05G 1/10; G05G 1/08; G05G 1/082

See application file for complete search history.

(56) References Cited

U.S. PATENT DOCUMENTS 4,300,525 A * 11/1981 Delgado ................. F24C 3/124
126/42
4,382,175 A * 5/1983 Huggler ................ A47J 37/085
219/396

* cited by examiner

*Primary Examiner* — Shawntina T Fuqua
(74) *Attorney, Agent, or Firm* — Alexander D. Raring

(57) ABSTRACT

A toaster oven comprising a housing defining a food cavity, an opening defined in the housing, a door movably affixed to the housing, a cooking grid selectively mountable within the housing, one or more heating elements within the housing, a timer controlling activation of the heating elements, and a timer control knob engaged with the timer. The timer control knob is selectively rotatable in a second direction from the off position to a third position to activate at least one of the one or more heating elements until the timer control knob is selectively rotated in the first direction back to the off position. The timer control knob has a selectively movable button, such that the timer control knob is only selectively rotatable in the second direction from the off position to the third position when the button is moved from a first position to a second position.

17 Claims, 8 Drawing Sheets

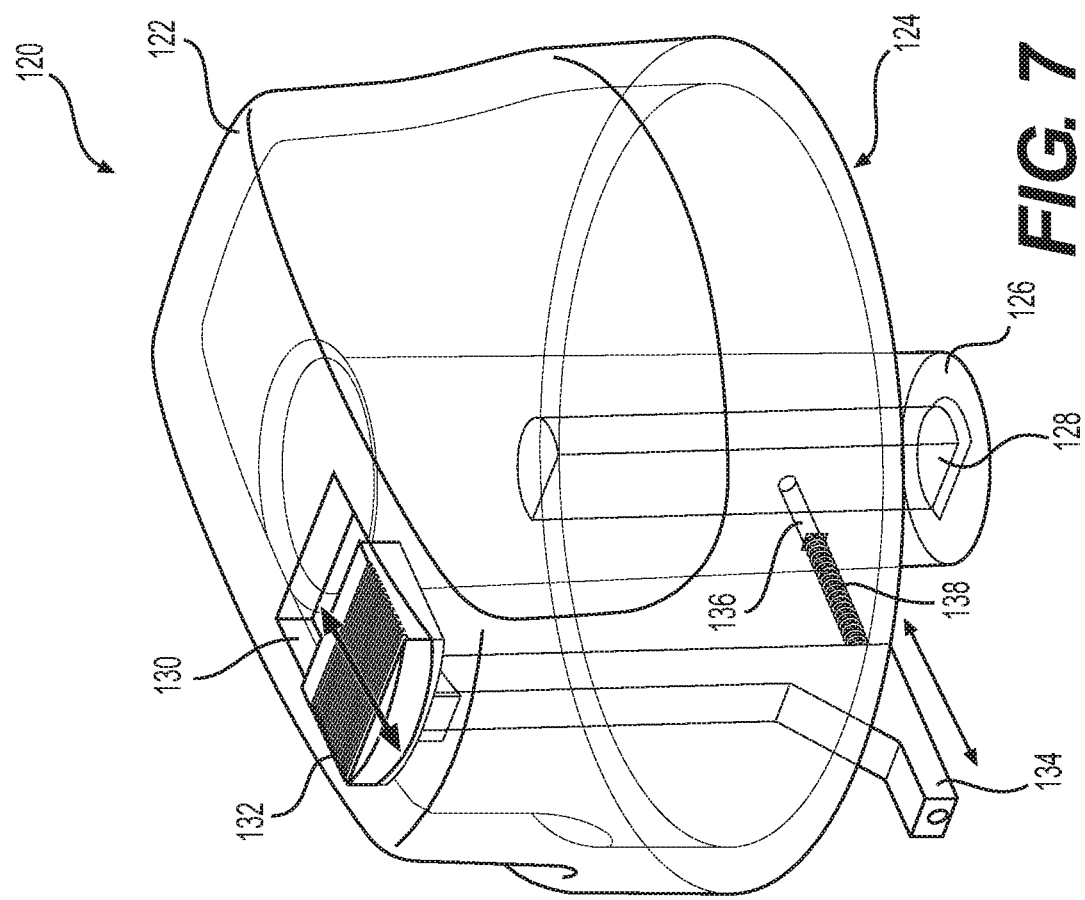

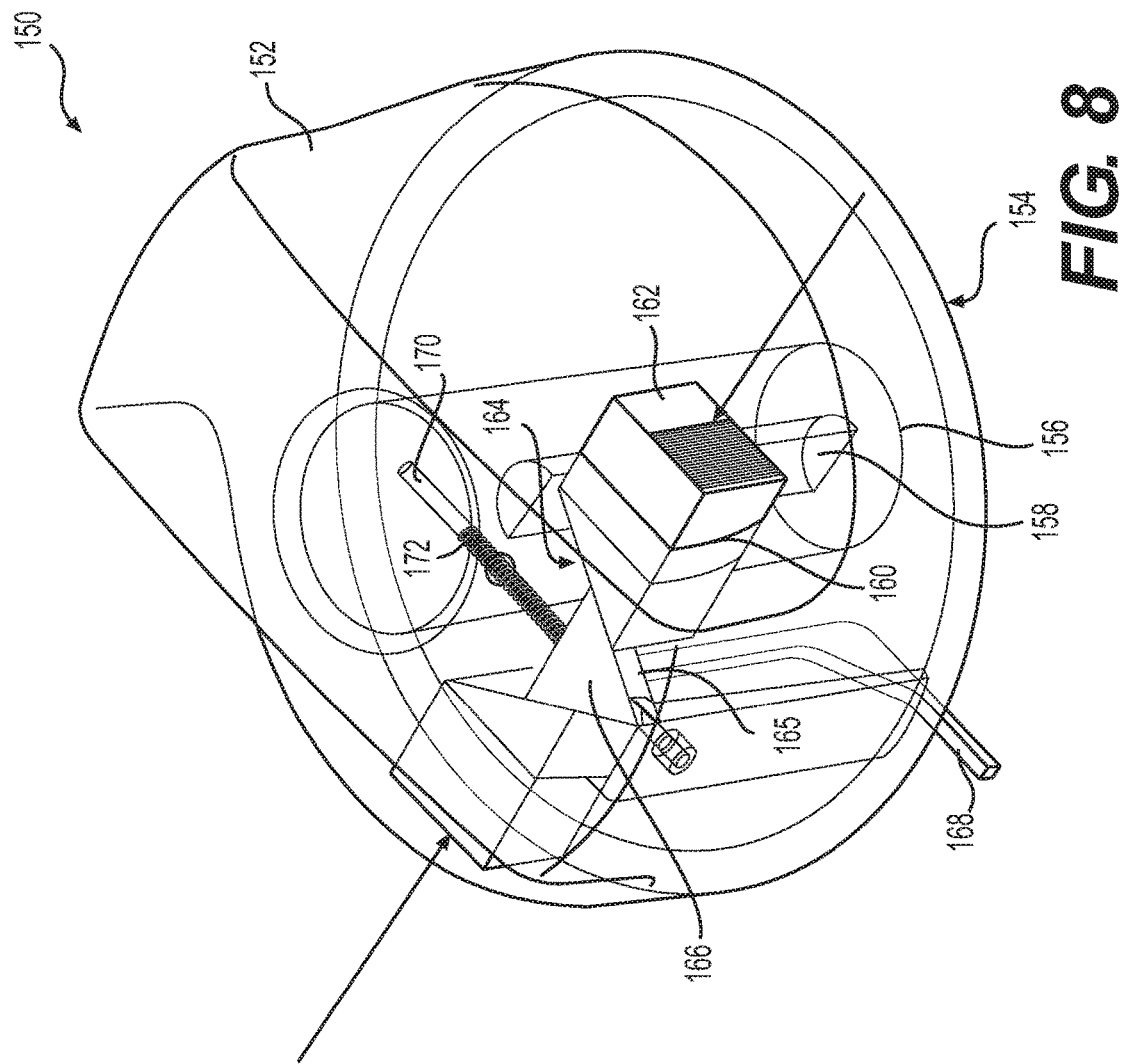

TOASTER OVEN CONTROL KNOB AND METHOD OF CONTROLLING A TOASTER OVEN

CROSS-REFERENCE TO RELATED APPLICATIONS

This application is a continuation-in-part of and claims priority to U.S. patent application Ser. No. 15/003,337, filed Jan. 21, 2016, which in turn claims priority to U.S. Provisional Patent Application Ser. No. 62/209,435, filed Aug. 25, 2015, the contents of which are incorporated herein by reference in its entirety.

BACKGROUND OF THE DISCLOSURE

The present disclosure relates generally to small appliances, and more particularly to toaster ovens.

A toaster oven is a small appliance that functions as both a toaster and an oven. In that regard, a toaster oven often has a control knob that controls the duration of operation of the toaster oven. As an example, a conventional toaster oven control panel 10 is illustrated in FIG. 1. The conventional control panel 10 has three control knobs. Control knob 12 controls the temperature during operation of the toaster oven. Control knob 14 controls which function is to be performed (e.g., toast, bake, broil, etc.). Control knob 16 controls the duration of operation of the toaster oven. In this regard, the control knob 16 can either activate the toaster oven for a desired number of minutes or activate the toaster oven until the user turns the toaster oven off (this latter feature is typically termed the "stay on" feature).

In the embodiment illustrated in FIG. 1, the toaster oven is deactivated when the control knob 16 is facing the "off" setting (i.e., the 9:00 clock position on the illustrated control panel 10, although this may vary). To activate the toaster oven for a desired number of minutes, the control knob 16 is turned clockwise to the number 18 indicative of the desired duration (in minutes) of operation of the toaster oven. The control knob 16 is typically coupled to a mechanical timer (not illustrated), so turning the control knob 16 clockwise to the desired number activates the timer and therefore the operation of the toaster oven for the set number of minutes.

To activate the toaster oven until it is turned off ("stay on"), the user turns the control knob 16 counterclockwise to the "stay on" setting 20. The toaster oven will then remain activated until the user turns the control knob 16 back to the "off" setting.

Occurrences of the power spring inside the mechanical timer forcing the dial past the "off" position into the "stay on" position have occurred. This creates the possibility, in very limited instances, for the toaster oven to remain energized indefinitely without any deliberate (accidental or intentional) action by the user, thereby creating a safety and fire hazard. It is also possible for a user to unintentionally turn the control knob to the "stay on" setting, especially if the user is turning the knob counterclockwise to turn off the toaster oven before the set time has expired. If the user does not notice that the knob has been unintentionally turned to the "stay on" setting, the toaster oven may remain on for an extended period, thereby creating a safety and fire hazard.

A change has been proposed to appliance industry safety standards that would require that, if a mechanical clock-operated switch incorporates a stay-on feature which is activated in the same direction as the countdown to "off," a secondary action is required to engage the stay-on feature.

It has heretofore not been discovered how to create a toaster oven with a clock-operated switch having a stay-on feature which is activated in the same direction as the countdown to "off," and also having the required secondary action to engage the stay-on feature, in a simple and cost-effective manner. The toaster oven control knob of the following disclosure accomplishes the above and other objectives and overcomes at least the above-described disadvantages of conventional toaster ovens.

BRIEF SUMMARY OF THE DISCLOSURE

A toaster oven is disclosed herein. In one embodiment of the subject appliance, the toaster oven comprises a housing defining a food cavity, an opening defined in the housing to enable access to the food cavity, a door movably affixed to the housing and selectively movable between a closed position closing off the opening thereby blocking access to the food cavity and an open position enabling access to the food cavity, a cooking grid selectively mountable within the housing, one or more heating elements within the housing, a timer controlling activation of the heating elements, and a timer control knob engaged with the timer. The timer control knob is selectively rotatable in a first direction from an off position to a second position to set the timer and activate at least one of the one or more heating elements for a desired amount of time corresponding to the second position. The timer control knob is selectively rotatable in a second direction from the off position to a third position to activate at least one of the one or more heating elements until the timer control knob is selectively rotated in the first direction back to the off position, the second direction being opposite the first direction. The timer control knob has a selectively movable button, and the timer control knob is only selectively rotatable in the second direction from the off position to the third position when the button is moved from a first position to a second position.

A stationary block may project from the housing. The timer control knob may comprise a lock lever engaged with the button such that moving the button moves the lock lever from a first position to a second position. In the first position, the lock lever is aligned with the stationary block to prevent rotation of the timer control knob in the second direction from the off position to the third position. In the second position, the lock lever is not aligned with the stationary block to permit rotation of the timer control knob in the second direction from the off position to the third position.

The lock lever may be biased to the first position. The lock lever may slide from the first position to the second position.

The selectively movable button may comprise a selectively depressible pushbutton. The toaster oven may further comprise one or more guides. One or both of the pushbutton and the lock lever may be slidably engaged with the one or more guides.

The toaster oven may further comprise a cam. The lock lever may depend from the cam. The cam may be slidably movable between a first position and a second position. The cam and the pushbutton may have correspondingly angled mating surfaces such that selectively depressing the pushbutton slidably moves the cam in a different direction than the pushbutton and therefore moves the lock lever from the first position to the second position. The correspondingly angled mating surfaces of the cam and the pushbutton may be such that selectively depressing the pushbutton slidably moves the cam in a direction perpendicular to the movement of the pushbutton.

The toaster oven may further comprise a support post. The cam may be slidably engaged with the support post. The toaster oven may further comprise a biasing spring encircling the support post. The biasing spring may bias the cam toward the first position.

The selectively depressible pushbutton may be a first selectively depressible pushbutton. The timer control knob may have a second selectively depressible pushbutton opposite the first selectively depressible pushbutton. The timer control knob may comprise a dummy lock lever engaged with the second pushbutton such that depressing the second pushbutton moves the dummy lock lever from a first position to a second position. The dummy lock lever does not engage the stationary block in the first position or in the second position.

The selectively movable button may comprise a selectively slidable switch. The switch may be slidably movable between a first position and a second position. The lock lever may depend from the switch.

The toaster oven may further comprise a support post. The lock lever may be slidably engaged with the support post. The toaster oven may further comprise a biasing spring encircling the support post. The biasing spring may bias the lock lever toward the first position.

The stationary block may be sized and positioned such that, when the knob is in the third position, the lock lever is prevented from returning to the first position.

The lock lever may have an angled surface that engages with the stationary block as the timer control knob is rotated from the third position in the first direction. Such engagement pushes the lock lever from the first position to the second position to permit rotation of the timer control knob in the first direction back to the off position without depressing the pushbutton.

The lock lever may have a planar leading edge that is substantially perpendicular to a corresponding engaging edge of the stationary block.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings:

FIG. 7 is a perspective transparent view of a toaster oven control knob, according to an alternative embodiment of the present disclosure.

FIG. 8 is a perspective transparent view of a toaster oven control knob, according to an alternative embodiment of the present disclosure.

DETAILED DESCRIPTION OF THE DISCLOSURE

Figure 1:
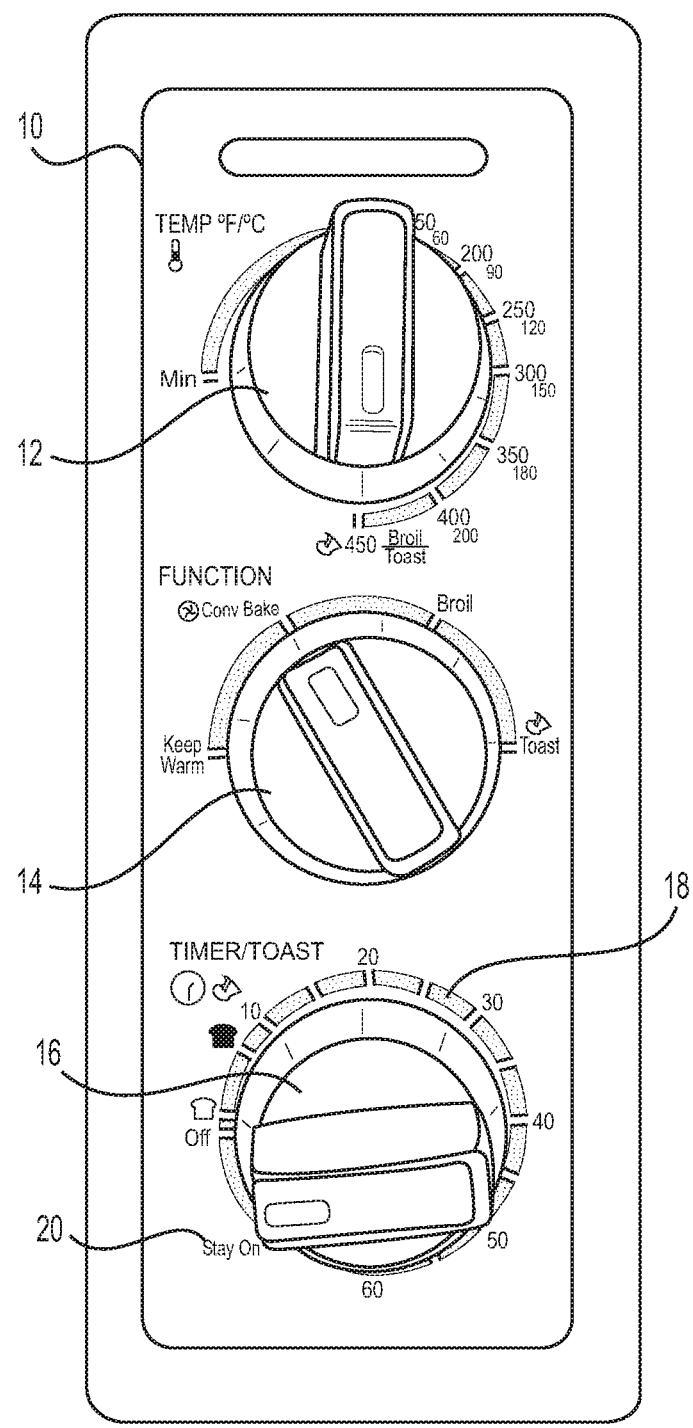
FIG. 1 is a front view of a conventional toaster oven control panel.
Figure 2:
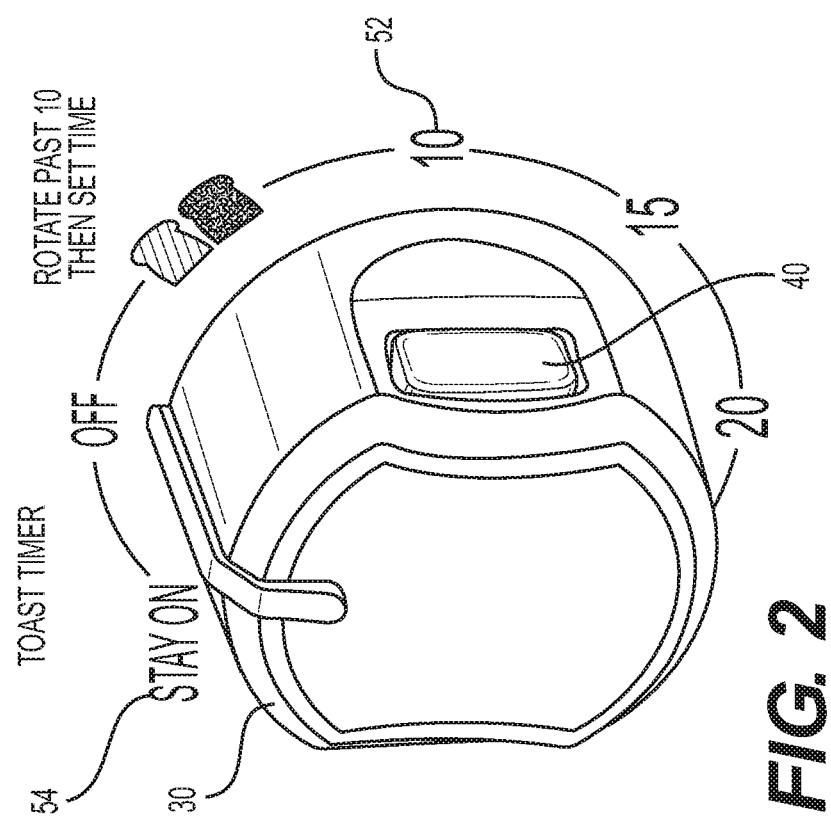
FIG. 2 is a perspective view of a toaster oven control knob, according to one embodiment of the present disclosure.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 2-5 illustrate a toaster oven control knob 30 in accordance with a preferred embodiment of the present disclosure. Control knob 30 and associated stationary block 60 provide a simple and cost-effective means for adding a secondary action to engage the stay-on feature in a toaster oven with a clock-operated switch having a stay-on feature which is activated in the same direction as the countdown to "off." Control knob 30 may be incorporated into any suitable toaster oven or other similar cooking appliance.

Similar to a conventional control knob, control knob 30 is selectively rotatable clockwise and counterclockwise to either activate a toaster oven for a desired number of minutes or to activate the toaster oven until it is turned off ("stay on"). In the illustrated embodiment, the toaster oven is deactivated when the control knob 30 is facing the "off" setting (i.e., the 12:00 clock position on the illustrated legend). To activate the toaster oven for a desired number of minutes, the control knob 30 is turned clockwise to the number 52 indicative of the desired duration (in minutes) of operation of the toaster oven. To activate the toaster oven until it is turned off ("stay on"), the user turns the control knob 30 counterclockwise to the "stay on" setting 54. The toaster oven will then remain activated until the user turns the control knob 30 counterclockwise back to the "off" setting.

As with a conventional control knob, the control knob 30 may be coupled to a mechanical timer (not illustrated). A stem 36 extends from the rear side of the control knob 30, such that the stem 36 protrudes through a hole 64 defined in the face of the toaster oven 56 (partially illustrated in FIG. 5) when the control knob 30 is mounted to the toaster oven. A cavity 38 defined in the stem 36 engages a corresponding post of the mechanical timer (not illustrated), so turning the control knob 30 turns the post of the mechanical timer.

The main body 32 of the control knob 30 may be generally bell-shaped, with an open rear side and hollow interior such that an internal chamber 34 is defined therein. The stem 36 extends out of this chamber 34.

Unlike a conventional control knob, the control knob 30 of embodiments of the present disclosure includes at least a first button 40 and optionally a second button 42. The first button 40 may be positioned on an exterior side of the control knob 30, such that the first button 40 is readily depressed by a user as needed (as described further below). If the second button 42 is present, the second button 42 may be positioned on an exterior side of the control knob 30 opposite the first button, such that both buttons are readily depressed simultaneously by a user as needed.

Figure 3:
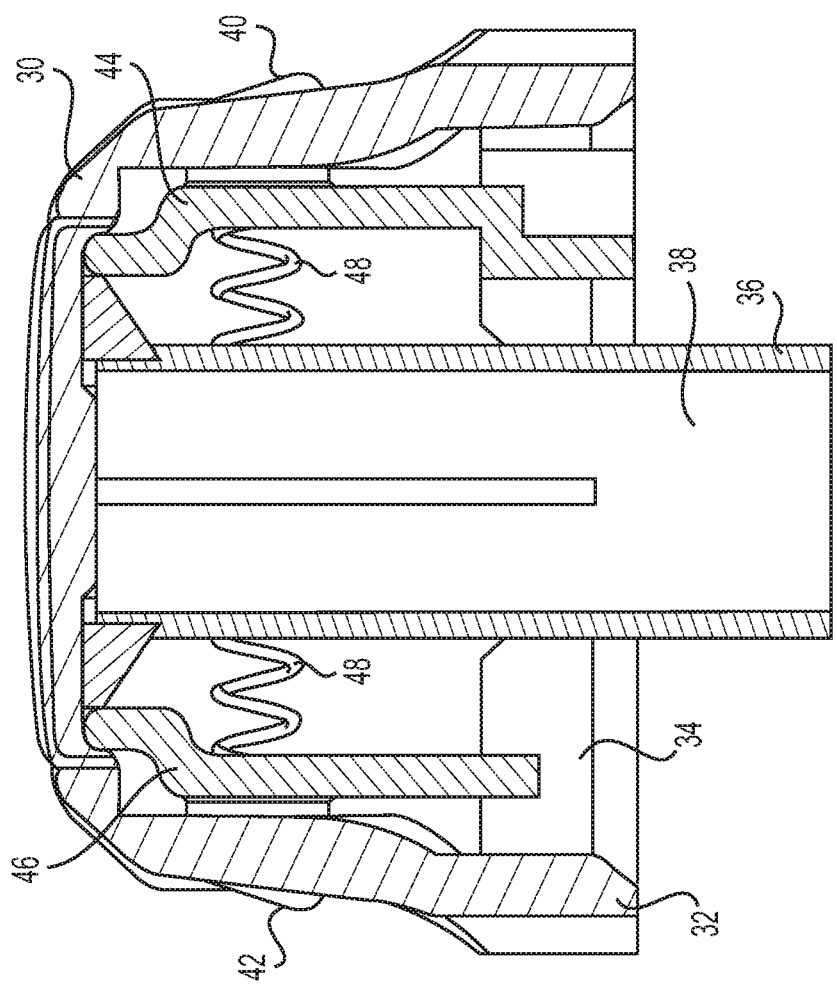
FIG. 3 is a cross-sectional view of the toaster oven control knob of FIG. 2.

The first button 40 is affixed to or integral with a lock lever 44 that extends toward the open rear side, as illustrated in FIG. 3. The lock lever 44 extends close enough to the opening at the rear side of the control knob to engage the stationary block (as described further below) but does not extend past the opening (which would cause the lock lever 44 to undesirably contact the face of the toaster oven). The first button 40 and lock lever 44 are biased outward, such as with bias spring 48.

If there is a second button 42, the second button may or may not be affixed to or integral with a lever 46 that may extend toward the open rear side, as illustrated in FIG. 3. The lever 46, if it exists, should not extend close enough to the opening at the rear side of the control knob to engage the stationary block at any point during the rotation of the control knob 30. The second button 42 and lever 46 are biased outward, such as with bias spring 48.

Figure 4:
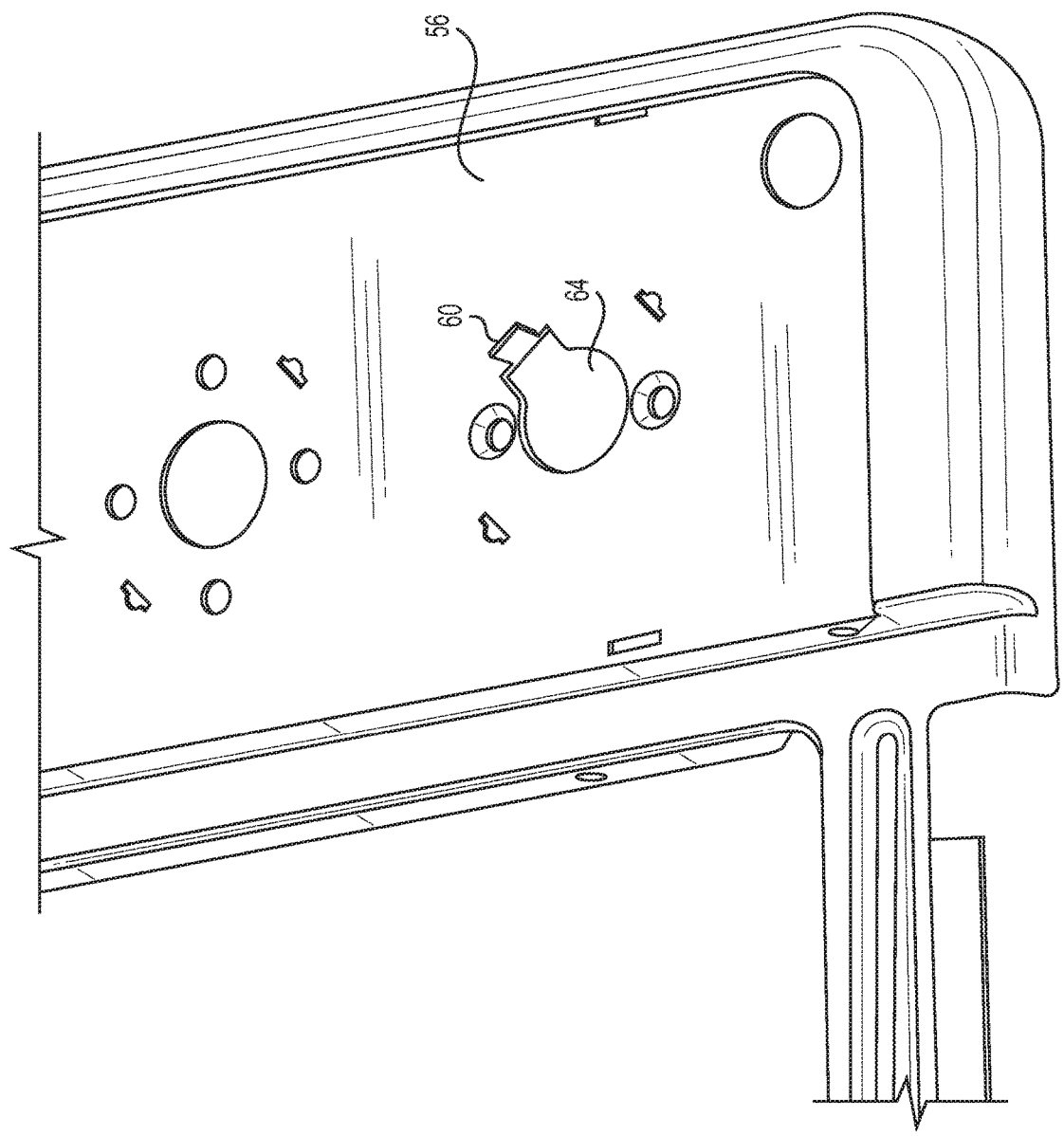
FIG. 4 is a partial front view of a toaster oven for use with the toaster oven control knob of FIG. 2, but with the toaster oven control knob removed.

A stationary block 60 protrudes outward from the face of the toaster oven 56. The stationary block is positioned such that the main body 32 of the control knob 30 covers the stationary block (i.e., most or all of the stationary block is within the chamber 34) when the control knob 30 is mounted to the toaster oven. As illustrated in FIG. 4, the stationary block 60 may comprise a thin planar projection. The stationary block 60 of FIG. 4 is stamped, cut, or otherwise formed from the face of the toaster oven as a tab that is folded out such that it is substantially perpendicular to the face of the toaster oven.

The stationary block 60 and lock lever 44 are positioned such that, when the control knob 30 is in place on the toaster oven and in the "off" setting, the lock lever 44 is adjacent the stationary block 60. In this regard, the distal end of the lock lever 44 would contact and be blocked by the stationary block 60 when a user attempts to turn the control knob 30 from the "off" position (counterclockwise in the illustrated embodiment) to the "stay on" position, thus preventing rotation of the control knob 30 from the "off" position to the "stay on" position (unless, as described below, the first button 40 is depressed to move the lock lever 44). The leading edge 58 of the distal end of the lock lever 44 may be squared off (planar), as seen in FIG. 5, to ensure good contact between the lock lever 44 and the stationary block 60 to block the rotation of the control knob from the "off" position (counterclockwise in the illustrated embodiment) to the "stay on" position.

In order for a user to be able to turn the control knob 30 from the "off" position (counterclockwise in the illustrated embodiment) to the "stay on" position, the user must depress the first button 40 (the user may also depress the second button 42, if present, but that may or may not be necessary). Depressing the first button 40 causes the lock lever 44 to move inward (for example, by a sliding or pivoting motion, or any other suitable motion or mechanism). This inward movement of the lock lever 44 allows the distal end of the lock lever 44 to clear the stationary block 60, thereby enabling the control knob 30 to be rotated (counterclockwise in the illustrated embodiment) from the "off" position to the "stay on" position. Once the distal end of the lock lever 44 has rotated past the stationary block 60 and the user releases the first button 40, the first button and the lock lever 44 will move outward and return to their original positions due to the outward biasing.

Figure 5:
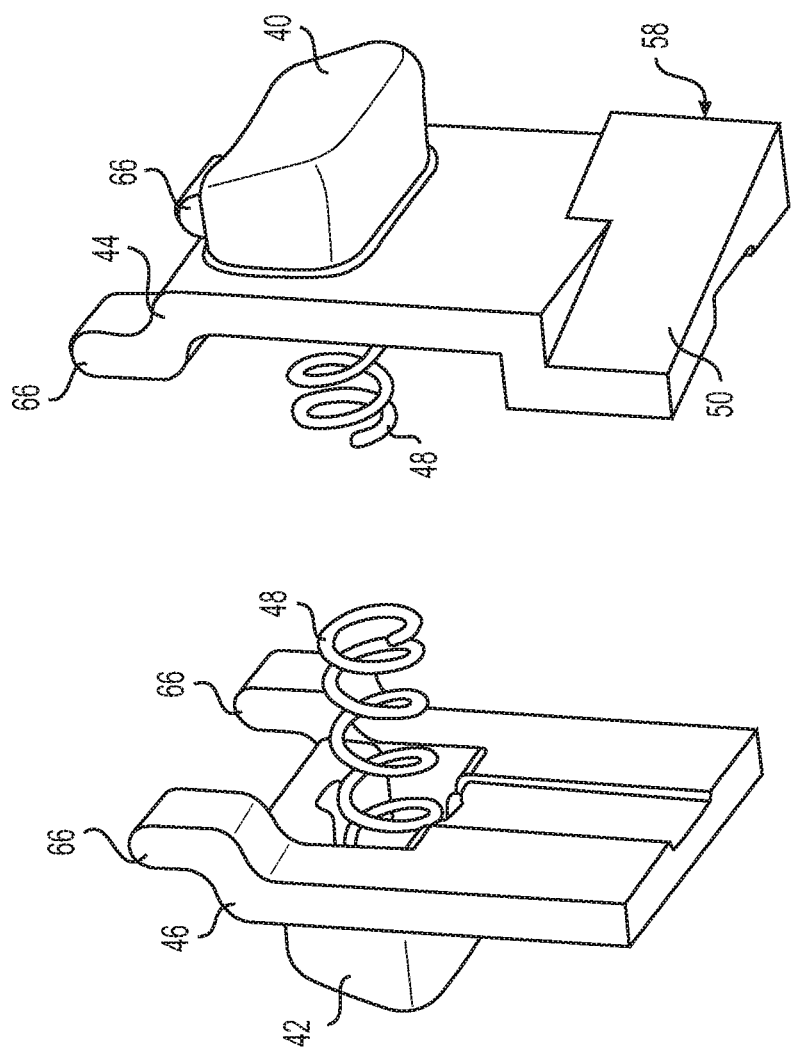
FIG. 5 is a perspective view of components of the toaster oven control knob of FIG. 2.

FIG. 5 illustrates the buttons, lock levers, and bias springs of control knob 30, removed from the control knob. As seen in FIG. 4, the first button 40 is integral with or affixed to lock lever 44, and the second button 42 is integral with or affixed to lock lever 46. As such, depressing the first button 40 causes the lock lever 44 to move inward and depressing the second button 42 causes the lock lever 46 to move inward. In the illustrated embodiment, the lock levers pivot inward when the corresponding button is depressed. Each lock lever comprises pivot arms 66 that engage the inside top surface of the knob to enable the distal ends (i.e., the ends closer to the face of the toaster oven) to pivot inward.

When the user wants to turn the toaster oven off (from the "stay on" position), the user rotates the control knob 30 clockwise from the "stay on" position to the "off" position. In order for the distal end of the lock lever 44 to NOT be blocked by the stationary block 60 when the user attempts to turn the control knob 30 clockwise from the "stay on" position to the "off" position, the user may be required to depress the first button 40 again. However, requiring the user to depress the first button 40 again may not be desirable. Instead, lock lever 44 (i.e., the lock lever which engages the stationary block) may have an angled surface 50 that engages with the stationary block as the control knob 30 is rotated from the "stay on" setting to the "off" setting. This engagement between the angled surface and the stationary block pushes the lock lever 44 inward (toward the stem 36) to permit rotation of the control knob back to the "off" setting without having to depress the first button 40. In other words, while it is necessary to depress the first button 40 to rotate the knob 30 from the "off" setting to the "stay on" setting, it is not necessary to depress the first button 40 to rotate the knob 30 from the "stay on" setting to the "off" setting. Once the distal end of the lock lever 44 has rotated past the stationary block 60, the first button and the lock lever 44 will move outward and return to their original positions due to the outward biasing.

Other shapes of the distal end of the lock lever 44 and of the stationary block 60 may be possible, as long as the desired blocking of the counterclockwise rotation from the "off" position to the "stay on" position is provided (except when the first button or a similar mechanism is depressed) and the desired allowance of the clockwise rotation of the control knob from the "stay on" position to the "off" position is enabled (preferably regardless of whether the first button or a similar mechanism is depressed).

The stationary block 60 comprises a thin metal tab. In alternative embodiments, the stationary block may be thicker. If the stationary block is thicker, it may be desirable for the stationary block to have an angled surface that engages with the angled surface of the lock lever as the control knob 30 is rotated from the "stay on" setting to the "off" setting. Having angled surfaces on both the lock lever and the stationary block may better facilitate the desired inward forcing of the lock lever to permit rotation of the control knob back to the "off" setting without having to depress the first button.

The stationary block may be any suitable height that provides the desired blocking of the counterclockwise rotation from the "off" position to the "stay on" position (except when the first button or a similar mechanism is depressed), but which does not otherwise interfere with the operation or rotation of the control knob.

It is described above that, once the distal end of the lock lever 44 has rotated past the stationary block 60 and the user releases the first button 40, the first button and the lock lever 44 will move outward and return to their original positions due to the outward biasing. In other words, the lock lever and the stationary block are clear of each other and not contacting when the control knob is in the "stay on" position. In alternative embodiments of the invention, the lock lever and/or stationary block may be sized and/or positioned such that the lock lever and the stationary block remain in contact, and the lock lever remains pushed inward, when the control knob is in the "stay on" position.

It may be desirable for there to be several degrees of rotational space between the lock lever and the stationary block when the control knob is in the "off" position to help ensure that the stationary block does not interfere with the inward motion of the lock lever.

Figure 6:
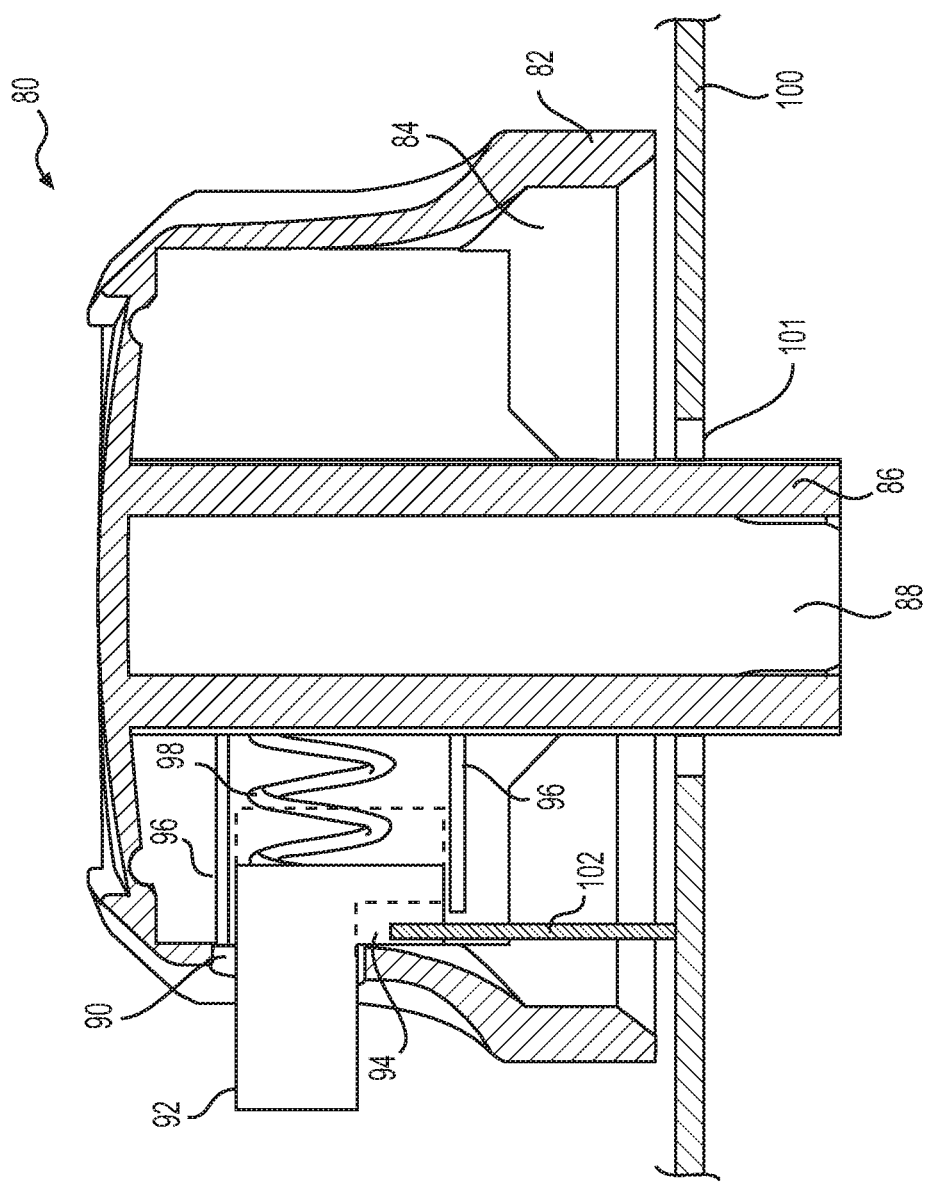
FIG. 6 is a cross-sectional view of a toaster oven control knob, according to an alternative embodiment of the present disclosure.

Referring now to FIG. 6, a toaster oven control knob 80 is illustrated in accordance with an alternative embodiment of the present disclosure. The control knob 80 is nearly identical to the control knob 30 described above. A stem 86 extends from the rear side of the control knob 80, such that the stem 86 protrudes through a hole 101 defined in the face 100 of a toaster oven when the control knob 80 is mounted to the toaster oven. A cavity 88 defined in the stem 86 engages a corresponding post of the mechanical timer (not illustrated), so turning the control knob 80 turns the post of the mechanical timer. The main body 82 of the control knob 80 may be generally bell-shaped, with an open rear side and hollow interior such that an internal chamber 84 is defined therein. The stem 86 extends out of this chamber 84.

The control knob 80 includes at least a first button 92 positioned on an exterior side of the control knob 80 (and optionally a second button (not illustrated)). The button 92 protrudes through an opening 90 in the main body 82. The button 92 is affixed to or integral with a lock lever 94 that extends toward the open rear side. The lock lever 94 extends close enough to the opening at the rear side of the control knob to engage the stationary block 102 that extends from the face 100 of the toaster oven, but does not extend past the opening (which would cause the lock lever 94 to undesirably contact the face of the toaster oven). The button 92 and lock lever 94 are biased outward, such as with bias spring 98.

Unlike the control knob 30 in which the lock lever 44 pivots when the button is depressed, the lock lever 94 of the control knob 80 slides inward when the button 92 is depressed. The button 92 and/or the lock lever 94 are slidably engaged with one or more guides 96 (two guides are illustrated in FIG. 6—one above and one below the button and lock lever) that support the button and/or lock lever and enable the inward and outward sliding motion when the button is, respectively, depressed and released. The dashed lines in FIG. 6 illustrate the position of the button 92 and lock lever 94 when the button 92 is depressed.

The control knob 80 functions the same as the control knob 30 in that, when the control knob 80 is in place on the toaster oven and in the "off" setting, the lock lever 94 is adjacent the stationary block 102. In this regard, the distal end of the lock lever 94 would contact and be blocked by the stationary block 102 when a user attempts to turn the control knob 80 from the "off" position to the "stay on" position, thus preventing rotation of the control knob 80 from the "off" position to the "stay on" position. In order for a user to be able to turn the control knob 80 from the "off" position to the "stay on" position, the user must depress the button 92, which causes the lock lever 94 to move slidably inward. This inward movement of the lock lever 94 allows the distal end of the lock lever 94 to clear the stationary block 102, thereby enabling the control knob 80 to be rotated from the "off" position to the "stay on" position.

Referring now to FIG. 7, a toaster oven control knob 120 is illustrated in accordance with an alternative embodiment of the present disclosure. The control knob 120 has a stem 126 that extends from the rear side of the control knob 120, such that the stem 126 protrudes through a hole (not illustrated) defined in the face of a toaster oven (not illustrated) when the control knob 120 is mounted to the toaster oven. A cavity 128 defined in the stem 126 engages a corresponding post of the mechanical timer (not illustrated), so turning the control knob 120 turns the post of the mechanical timer. The main body 122 of the control knob 120 may be generally bell-shaped, with an open rear side and hollow interior such that an internal chamber 124 is defined therein. The stem 126 extends out of this chamber 124.

The control knob 120 comprises a selectively slidable switch 132. The switch 132 projects out of hole 130 in the front surface of the control knob. Such a switch could alternatively be positioned on a different surface, such as a side surface of the control knob. The switch 132 is slidably movable as illustrated by the arrow in FIG. 7. A lock lever 134 depends from the switch 132, such that the lock lever 134 moves inward (toward the stem) and outward (away from the stem) with the sliding movement of the switch 132. A support post 136 helps support the lower end of the lock lever 134. One end of the support post 136 is affixed to the stem 126 and the other end of the support post 136 is slidably engaged with the lock lever 134 (i.e., the support post 136 is variably slidably inserted into a corresponding hole in the lock lever 134). A biasing spring 138 encircles the support post 136 and biases the lock lever 134 outward.

As seen in FIG. 7, the lock lever 134 is generally L-shaped, with the lower section having a distal end that points away from the stem 126. Unlike the lock levers described above in relation to other embodiments, the lock lever 134 of the control knob 120 extends past the opening at the rear side of the control knob. Thus, when the control knob 120 is mounted on the toaster oven, the lock lever 134 extends through the hole defined in the face of the toaster oven. Because of the L-shape and extended length of the lock lever 134 of the control knob 120, the lock lever 134 is able to engage a stationary block (not illustrated) that projects inward from the face of the toaster oven (i.e., the stationary block is on the underside of the face of the toaster oven).

Referring now to FIG. 8, a toaster oven control knob 150 is illustrated in accordance with an alternative embodiment of the present disclosure. The control knob 150 has a stem 156 that extends from the rear side of the control knob 150, such that the stem 156 protrudes through a hole (not illustrated) defined in the face of a toaster oven (not illustrated) when the control knob 150 is mounted to the toaster oven. A cavity 158 defined in the stem 156 engages a corresponding post of the mechanical timer (not illustrated), so turning the control knob 150 turns the post of the mechanical timer. The main body 152 of the control knob 150 may be generally bell-shaped, with an open rear side and hollow interior such that an internal chamber 154 is defined therein. The stem 156 extends out of this chamber 154.

The control knob 150 has two opposing selectively depressible pushbuttons 162. Each pushbutton 162 extends through a corresponding opening in the main body 152. The control knob 150 has a cam 166, and a lock lever 168 that depends from the cam 166. The cam is slidably movable between inward (toward the stem 156) and outward (away from the stem 156).

The cam 166 is supported by a support post 170 (optionally, a second support post may be used to help support the lower end of the lock lever 168, similar to the control knob 120). One end of the support post 170 is affixed to the stem 156 and the other end of the support post 170 is slidably engaged with the cam 166 (i.e., the support post 170 is variably slidably inserted into a corresponding hole in the cam 166). A biasing spring 172 encircles the support post 170 and biases the cam 166 (and therefore the lock lever 168) outward.

The pushbuttons 162 and the cam 166 have correspondingly angled mating surfaces 164, 165 (respectively). The cam 166 has opposing angled mating surfaces, one to mate with the angled surface of each of the pushbuttons, such that the cam has a generally triangular shape as seen in FIG. 8. These angled mating surfaces enable a camming action such that selectively depressing the pushbuttons 162 as indicated by the arrows in FIG. 8 slidably moves the cam 166 inward (toward the stem 156) which correspondingly moves the lock lever 168 inward. The correspondingly angled mating surfaces 165 of the cam 166 and the angled mating surfaces 164 of the pushbuttons 162 may be such that selectively depressing the pushbuttons slidably moves the cam (and therefore the lock lever) in any suitable direction. Any suitable camming mechanism may be used. Any suitable position and number of pushbuttons may be used.

As seen in FIG. 8, the lock lever 168 is generally L-shaped, with the lower section having a distal end that points away from the stem 156. Unlike the lock levers described above in relation to other embodiments, the lock lever 168 of the control knob 150 extends past the opening at the rear side of the control knob. Thus, when the control knob 150 is mounted on the toaster oven, the lock lever 168 extends through the hole defined in the face of the toaster oven. Because of the L-shape and extended length of the lock lever 168 of the control knob 150, the lock lever 168 is able to engage a stationary block (not illustrated) that projects inward from the face of the toaster oven (i.e., the stationary block is on the underside of the face of the toaster oven).

As described above, in one or more embodiments of the present disclosure when the control knob has been turned from the off position to the "stay on" position and the button(s) or sliding switch is released, the lock lever returns to its original (outward) position because the lock lever loses contact with the stationary block and because the lock lever is biased outward. As described above, the lock lever may have an angled surface that engages with the stationary block as the control knob is rotated from the "stay on" setting to the "off" setting to push the lock lever inward (toward the stem) to permit rotation of the control knob back to the "off" setting without having to depress the button(s) or slide the switch. In alternative embodiments of the present disclosure, the stationary block may be sized and positioned such that when the control knob has been turned from the off position to the "stay on" position and the button(s) or sliding switch is released, the lock lever maintains contact with the stationary block (typically because a longer or wider stationary block is used) and the lock lever is prevented from returning to its original (outward) position while the control knob is in the "stay on" position. In this regard, the control knob may be rotated back to the "off" setting without having to depress the button(s) or slide the switch (without angling a surface of the lock lever as described above).

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

That which is claimed:

1. A toaster oven comprising:
a housing defining a food cavity;
an opening defined in the housing to enable access to the food cavity;
a door movably affixed to the housing and selectively movable between a closed position closing off the opening thereby blocking access to the food cavity and an open position enabling access to the food cavity;
a cooking grid selectively mountable within the housing;
one or more heating elements within the housing;
a timer controlling activation of the heating elements; and
a timer control knob engaged with the timer, the timer control knob being selectively rotatable in a first direction from an off position to a second position to set the timer and activate at least one of the one or more heating elements for a desired amount of time corresponding to the second position, the timer control knob being selectively rotatable in a second direction from the off position to a third position to activate at least one of the one or more heating elements until the timer control knob is selectively rotated in the first direction back to the off position, the second direction being opposite the first direction, the timer control knob having a selectively movable button;
wherein the timer control knob is only selectively rotatable in the second direction from the off position to the third position when the button is moved from a first position to a second position.

2. The toaster oven of claim 1, wherein a stationary block projects from the housing;
wherein the timer control knob comprises a lock lever engaged with the button such that moving the button moves the lock lever from a first position to a second position;
wherein, in the first position, the lock lever is aligned with the stationary block to prevent rotation of the timer control knob in the second direction from the off position to the third position; and
wherein, in the second position, the lock lever is not aligned with the stationary block to permit rotation of the timer control knob in the second direction from the off position to the third position.

3. The toaster oven of claim 2, wherein the lock lever is biased to the first position.

4. The toaster oven of claim 2, wherein the lock lever slides from the first position to the second position.

5. The toaster oven of claim 2, wherein the selectively movable button comprises a selectively depressible pushbutton.

6. The toaster oven of claim 5, further comprising one or more guides;
wherein one or both of the pushbutton and the lock lever are slidably engaged with the one or more guides.

7. The toaster oven of claim 5, further comprising a cam;
wherein the lock lever depends from the cam;
wherein the cam is slidably movable between a first position and a second position; and
wherein the cam and the pushbutton have correspondingly angled mating surfaces such that selectively depressing the pushbutton slidably moves the cam in a different direction than the pushbutton and therefore moves the lock lever from the first position to the second position.

8. The toaster oven of claim 7, wherein the correspondingly angled mating surfaces of the cam and the pushbutton are such that selectively depressing the pushbutton slidably moves the cam in a direction perpendicular to the movement of the pushbutton.

9. The toaster oven of claim 7, further comprising a support post;

wherein the cam is slidably engaged with the support post.

10. The toaster oven of claim 9, further comprising a biasing spring encircling the support post;

wherein the biasing spring biases the cam toward the first position.

11. The toaster oven of claim 5, wherein the selectively depressible pushbutton is a first selectively depressible pushbutton;

wherein the timer control knob has a second selectively depressible pushbutton opposite the first selectively depressible pushbutton;

wherein the timer control knob comprises a dummy lock lever engaged with the second pushbutton such that depressing the second pushbutton moves the dummy lock lever from a first position to a second position;

wherein the dummy lock lever does not engage the stationary block in the first position or in the second position.

12. The toaster oven of claim 2, wherein the selectively movable button comprises a selectively slidable switch, the switch being slidably movable between a first position and a second position; and wherein the lock lever depends from the switch.

13. The toaster oven of claim 12, further comprising a support post;

wherein the lock lever is slidably engaged with the support post.

14. The toaster oven of claim 13, further comprising a biasing spring encircling the support post;

wherein the biasing spring biases the lock lever toward the first position.

15. The toaster oven of claim 2, wherein the stationary block is sized and positioned such that, when the knob is in the third position, the lock lever is prevented from returning to the first position.

16. The toaster oven of claim 2, wherein the lock lever has an angled surface that engages with the stationary block as the timer control knob is rotated from the third position in the first direction, such engagement pushing the lock lever from the first position to the second position to permit rotation of the timer control knob in the first direction back to the off position without depressing the pushbutton.

17. The toaster oven of claim 2, wherein the lock lever has a planar leading edge that is substantially perpendicular to a corresponding engaging edge of the stationary block.

* * * * *